US007323523B2

(12) United States Patent
Hoang et al.

(10) Patent No.: US 7,323,523 B2
(45) Date of Patent: Jan. 29, 2008

(54) ADJUSTING POLYMER CHARACTERISTICS THROUGH PROCESS CONTROL

(75) Inventors: Peter Phung Minh Hoang, Calgary (CA); Cliff Robert Baar, Calgary (CA); Victoria Ker, Calgary (CA); Peter Zoricak, Calgary (CA); Paul Mesquita, Calgary (CA)

(73) Assignee: Nova Chemicals (International) S.A. (CH)

( * ) Notice: Subject to any disclaimer, the term of this patent is extended or adjusted under 35 U.S.C. 154(b) by 201 days.

(21) Appl. No.: 11/156,896

(22) Filed: Jun. 20, 2005

(65) Prior Publication Data

US 2006/0122362 A1  Jun. 8, 2006

Related U.S. Application Data

(63) Continuation-in-part of application No. 11/006,075, filed on Dec. 7, 2004.

(51) Int. Cl.
*C08F 4/64* (2006.01)
*C08F 2/12* (2006.01)
*C08F 2/34* (2006.01)

(52) U.S. Cl. ............... 526/73; 526/113; 526/114; 526/118; 526/119; 526/901; 526/905

(58) Field of Classification Search ........... 526/73, 526/113, 114, 118, 119, 901, 905; 502/102
See application file for complete search history.

(56) References Cited

U.S. PATENT DOCUMENTS

| 4,530,914 A | 7/1985 | Ewen et al. ............. 502/113 |
|---|---|---|
| 4,719,193 A | 1/1988 | Levine et al. ............. 502/107 |
| 5,434,116 A | 7/1995 | Sone et al. ............. 502/103 |
| 5,554,775 A | 9/1996 | Krishnamurti et al. ......... 556/7 |
| 5,637,659 A | 6/1997 | Krishnamurti et al. ...... 526/133 |
| 5,783,512 A | 7/1998 | Jacobsen et al. ............. 502/124 |
| 5,834,393 A | 11/1998 | Jacobsen et al. ............. 502/152 |
| 6,087,293 A | 7/2000 | Carnahan et al. ........... 502/158 |
| 6,277,931 B1 * | 8/2001 | Jaber et al. ............. 526/65 |
| 6,309,997 B1 | 10/2001 | Fujita et al. ............. 502/167 |
| 6,486,273 B1 * | 11/2002 | McKay et al. ............. 526/113 |
| 6,828,395 B1 * | 12/2004 | Ehrman et al. ............. 526/114 |
| 7,064,096 B1 * | 6/2006 | Hoang et al. ............. 502/103 |
| 2002/0045711 A1 | 4/2002 | Backman et al. ............. 525/240 |
| 2002/0077431 A1 | 6/2002 | Whiteker ............. 526/113 |

FOREIGN PATENT DOCUMENTS

EP     0 659 773 B1    8/1998

OTHER PUBLICATIONS

Hansch et al., A Survey of Hammett Substituent Constants and Resonance and Field Parameters, Chemical Reviews, 1991, vol. 91, pp. 165-195.
Peri et al., The Surface Structure Of Silica Gel, The Journal of Physical Chemistry, vol. 72, No. 8, pp. 2926-2933, Aug. 1968.
Quirk et al., Transition Metal Catalyzed Polymerizations, Cambridge University Press, pp. 396-416, 1989.

* cited by examiner

*Primary Examiner*—Fred Teskin
(74) *Attorney, Agent, or Firm*—Kenneth H. Johnson

(57) ABSTRACT

Properties of a polymer produced in gas phase or slurry phase using a dual catalyst such as polydispersity and comonomer incorporation, may be controlled by controlling reaction parameters such as temperature, (co)monomer pressure, hydrogen partial pressure and the presence of non-polymerizable hydrocarbon. This provides an easy method to control the bimodality of a polymer as well as comonomer incorporation.

20 Claims, 3 Drawing Sheets

ADJUSTING POLYMER CHARACTERISTICS THROUGH PROCESS CONTROL

This is a continuation-in-part of Ser. No. 11/006,075 filed on Dec. 7, 2004.

FIELD OF THE INVENTION

The present invention relates to a gas phase or slurry process to control the ratio of the higher molecular weight component and the lower molecular weight component and the comonomer incorporation or placement (e.g. regular or reverse) in a bimodal resin produced in the presence of a mixed catalyst system by controlling one or more steps selected from the group consisting of:

(a) altering the temperature of the reaction by at least 2° C.;

(b) altering the partial pressure of the hydrogen component of the reaction mixture by at least 0.02 psi;

(c) altering the partial pressure of one or more monomers or comonomers in the reaction mixture by not less than 10 psi; and (d) altering the amount of non polymerizable hydrocarbon in a gas phase reaction mixture by not less than 0.5 mole %.

BACKGROUND OF THE INVENTION

The original single site catalysts of the mid 1980's, such as a metallocene catalyst, produced resin having a narrow polydispersity (Mw/Mn) typically in the range from about 2.5 to 3.5. Early on it was recognized that either blending such resins or the use of different metallocene catalyst, in the same reactor could produce bimodal resins, each component having a narrow polydispersity and the blend having a broader polydispersity. It was felt such resins would provide a good balance of processability and physical properties such as resin toughness. There are an increasing number of patents and applications in this field.

U.S. Pat. No. 4,530,914 issued Jul. 23, 1985 to Ewen et al., assigned to EXXON Research & Engineering Co. teaches the use in the same reactor of two metallocene catalysts each having different propagation and termination rate constants for ethylene polymerizations. The catalyst combination taught in the patent is not the same as that contemplated by the present invention.

There are a number of patents wherein a bimodal resin is produced having a controlled molecular weight distribution by using different single site catalysts such as metallocenes in two or more tandem reactors. United States patent application 2002/0045711 in the name of Backman et al., published Apr. 18, 2002 is illustrative of this type of art. The reference teaches away from the present invention in that the present invention contemplates the use of a single reactor, not tandem reactors.

U.S. Pat. No. 6,309,997 issued Oct. 30, 2001 teaches an olefin polymerization catalyst using a phenoxide (preferably a salicylaldimine) ligand for use in the polymerization of olefins. The patent does not teach the use of mixed catalysts systems for bimodal resins nor does it teach process control to adjust the polymer characteristics such as bimodality and comonomer incorporation.

United States patent application 2002/0077431 published Jun. 20, 2002 in the name of Whiteker discloses a process for the polymerization and oligomerization of olefins in the presence of a mixed catalyst system in a single reactor. The catalyst system as disclosed comprises a first component similar to the first component in the catalyst system of the present invention except that at least one of substituents $R^3$, $R^4$, $R^5$, $R^6$, $R^9$ and $R^{10}$ must have a Hammett $\sigma_p$ value (Hansch et al., Chem Rev. 1991, 91, 165) greater than 0.2 (i.e. at least one of these substituents needs to be a sufficiently electron withdrawing group, (e.g. $CF_3$, Br, etc.)). In the process according to the present invention all $R^3$, $R^4$, $R^5$, $R^8$, $R^9$ and $R^{10}$ are hydrocarbyl substituents which have a Hammett value of less than 0.2. Further, the reference fails to teach or suggest the molecular weight distribution of the components in the resulting polymer may be altered or controlled by altering or controlling the reaction conditions.

The present invention seeks to provide a relatively simple method for controlling the ratio of the molecular weight distribution of a bimodal resin and optionally the comonomer placement or distribution in a bimodal resin produced in a single gas or slurry phase reactor in the presence of a mixed catalyst system on the same support by controlling one or more steps selected from the group consisting of:

(a) altering the temperature of the reaction by at least 2° C. within the range from 50 to 120° C. in a gas phase reactor and within the range from 20 to 150° C. in a slurry phase reactor;

(b) altering the partial pressure of the hydrogen component of the reaction mixture by at least 0.02 psi (0.138 KPa);

(c) altering the partial pressure of one or more monomers in the reaction mixture by not less than 10 psi (68.94 KPa); and (d) altering the amount of non polymerizable hydrocarbon in the reaction mixture in a gas phase by not less than 0.5 mole %.

SUMMARY OF THE INVENTION

The present invention provides processes for controlling one or more of the ratio of high molecular weight polymer to low molecular weight polymer and comonomer incorporation, in polymerization process selected from the group consisting of a continuous fluidized bed gas phase polymerization at a temperature from 50 to 120° C. and a slurry polymerization in a single reactor at a temperature from 20 to 150° C. of a reaction mixture comprising one or more of hydrogen, nitrogen, $C_{1-7}$ non polymerizable hydrocarbons, and $C_{2-8}$ olefins polymerized in the presence of a dual catalyst wherein both catalyst components are on the same or different supports and the activity of each catalyst has a different response to one or more of temperature, partial pressure of hydrogen in the reaction mixture, partial pressure of (co)monomers (e.g. ethylene) in the reaction mixture, and the amount of inert hydrocarbons in the reaction mixture, which comprises one or more steps selected from the group consisting of:

(a) altering the temperature of the reaction by at least 2° C. within the range from 50 to 120° C. for a gas phase polymerization and within the range from 20 to 150° C. for a slurry phase polymerization;

(b) altering the partial pressure of the hydrogen component of the reaction mixture by at least 0.02 psi (0.138 KPa);

(c) altering the partial pressure of one or more monomers (e.g. ethylene) in the reaction mixture by not less than 10 psi (68.94 KPa); and (d) altering the amount of non polymerizable hydrocarbon in the gas phase reaction mixture by not less than 0.5 mole %.

The present invention further provides a dual catalyst system suitable for producing a bimodal resin preferably having at least one higher molecular weight (Mw) fraction having a greater comonomer incorporation than that of a lower molecular weight (Mw) fraction wherein:

(i) the first component of which comprises a catalyst of the formula:

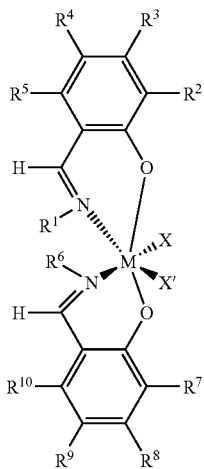

wherein M is a group IV transition metal; $R^1$ and $R^6$ are independently selected from the group consisting of a hydrogen atom, alkyl radicals having up to 15, carbon atoms, aryl radicals having up to 25, carbon atoms, alkoxy radicals having up to 15 carbon atoms, and amido radicals which are unsubstituted or substituted by up to two alkyl radicals containing up to 15 carbon atoms, $R^2$ and $R^7$ are independently selected from the group consisting of alkyl radicals having up to 15 carbon atoms, aryl radicals having up to 25 carbon atoms and silyl radicals of the formula $Si(R^{11})_3$ wherein each $R^{11}$ is independently selected from the group consisting of alkyl radicals having up to 15 carbon atoms, and aryl radicals having up to 25 carbon atoms; $R^3$, $R^4$, $R^5$, $R^8$, $R^9$ and $R^{10}$ are independently selected from the group consisting of a hydrogen atom, a heteroatom containing group having up to 20 carbon atoms, and a hydrocarbon group containing up to 25 carbon atoms, provided that none of these groups has a Hammett $\sigma_p$ value greater than 0.20; X and X' are selected from the group consisting of a halogen atom, alkyl radicals having up to 15 carbon atoms, aryl radicals having up to 25 carbon atoms, alkoxy radicals having up to 15 carbon atoms, amido radicals which are unsubstituted or substituted by up to two alkyl radicals containing up to 15 carbon atoms, and phenoxy radicals having up to 18 carbon atoms;

(ii) the second component of which comprises a catalyst of the formula:

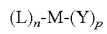

wherein M is selected from the group consisting of Ti, Zr and Hf; L is a monoanionic ligand independently selected from the group consisting of cyclopentadienyl-type ligands, and a bulky heteroatom ligand containing not less than five atoms in total (typically of which at least 20%, preferably at least 25% numerically are carbon atoms) and further containing at least one heteroatom selected from the group consisting of boron, nitrogen, oxygen, phosphorus, sulfur and silicon said bulky heteroatom ligand being sigma or pi-bonded to M, Y is independently selected for the group consisting of activatable ligands; n may be from 1 to 3; and p may be from 1 to 3, provided that the sum of n+p equals the valence state of M, and further provided that two L ligands may be bridged.

DETAILED DESCRIPTION

Figure 1:
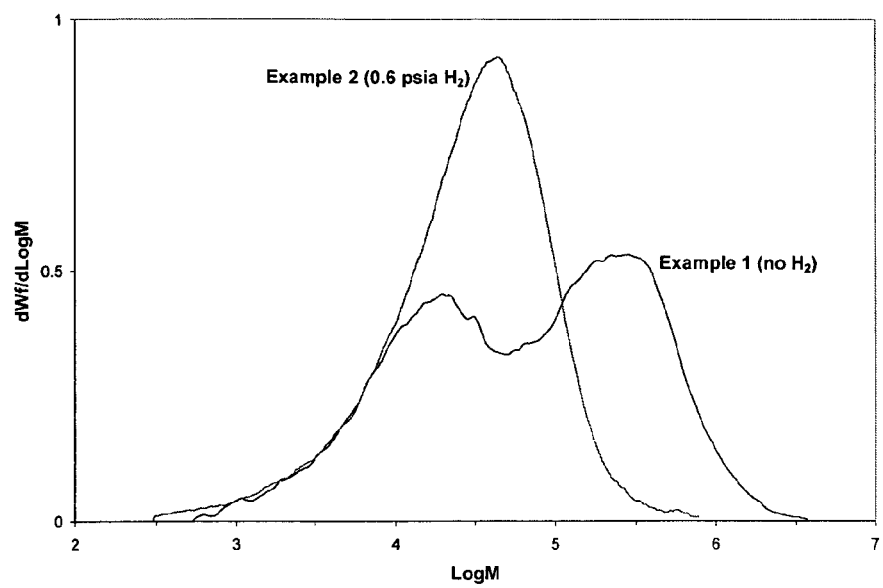
FIG. 1 shows the GPC profiles of the polymers produced in Examples 1 and 2.

As used in this specification the following words or phrases have the following meanings:

Polydispersity is the ratio of the weight average molecular weight (as determined by GPC) to the number average molecular weight (as determined by GPC) (i.e. Mw/Mn) of any component in the bimodal resin or the bimodal resin per se.

The term "cyclopentadienyl" refers to a 5-member carbon ring having delocalized bonding within the ring and typically being bound to the active catalyst site, generally a group 4 metal (M) through $\eta^5$-bonds.

The phrase mixed catalyst or dual catalyst or catalyst system on a single support means that substantially both components (e.g. at least about 90 weight %, preferably more than 98 weight % of support contains both catalysts) are on the same support. The catalyst components may be deposited either sequentially or concurrently on the same support particles.

In another embodiment, the catalyst could be a blend of two or more catalysts each of which happen to be on the same type of or a similar or a different type of support (e.g. silica, alumina, and polymeric supports). The different catalysts are supported on different particles.

The gas phase polymerization of olefins and particularly alpha olefins had been known for at least about 30 years. Generally a gaseous mixture comprising from 0 to 15 mole % of hydrogen, from 0 to 30 mole % of one or more $C_{3-8}$ alpha olefins, from 15 to 100 mole % of ethylene, and from 0 to 75 mole % of nitrogen and/or a non-polymerizable hydrocarbon at a temperature from 50° C. to 120° C., preferably from 60° C. to 120° C., most preferably from 75° C. to about 110° C., and at pressures typically not exceeding 3,500 KPa (about 500 psi), preferably not greater than 2,400 KPa (about 350 psi) are polymerized in the presence of a mixed catalyst system on a single support in a single reactor.

Slurry polymerization is well known in the art. The polymerization is conducted in an inert diluent in which the resulting polymer is not soluble. The monomers may be soluble in the diluent. The diluent is typically a hydrocarbyl compound such as a $C_{5-12}$ hydrocarbon which may be unsubstituted or substituted by a $C_{1-4}$ alkyl radical. Preferably the diluent is unsubstituted. Some potential diluents include pentane, hexane, heptane, octane, cyclohexane and methylcyclohexane. The diluent may be hydrogenated naphtha. The diluent may also be a $C_{8-12}$ aromatic hydrocarbon such as that sold by Exxon Chemical Company under the trademark ISOPAR® E.

Generally the monomers are dispersed or dissolved in the diluent. The reaction takes place at temperatures from about 20° C. to about 120° C., preferably from about 40° C. to 100° C., desirably from 50° C. to 95° C. The pressure in the reactor may be from about 15 psi to about 4,500 psi, preferably from about 100 to 1,500 psi. The reactors may be "loop" reactors with a settling leg to remove polymer.

Suitable olefin monomers may be ethylene and $C_{3-20}$ mono- and di-olefins. Preferred monomers include ethylene and $C_{3-8}$ alpha olefins which are unsubstituted or substituted by up to two $C_{1-6}$ alkyl radicals. Illustrative non-limiting examples of such alpha olefins are one or more of propylene, 1-butene, 1-hexene and 1-octene.

The polyethylene polymers which may be prepared in accordance with the present invention typically comprise not less than 60, preferably not less than 70, most preferably not less than 80 weight % of ethylene and the balance of one or more $C_{3-8}$ alpha olefins, preferably selected from the group consisting of 1-butene, 1-hexene and 1-octene.

The polymers prepared in accordance with the present invention have a bimodal or multimodal molecular weight distribution. Overall, the weight average molecular weight (Mw) will preferably be greater than about 30,000 ranging up to $10^7$, preferably $10^5$ to $5 \times 10^5$. Typically the polymer will have a density greater than 0.89 g/cc, preferably greater than 0.910 g/cc, typically in the range from 0.915 to 0.960 g/cc. There will be a lower molecular weight component seen as a peak or shoulder on a GPC analysis and there will be one or more higher molecular weight components also seen as a separate peak or shoulder on a GPC analysis. Generally the lower molecular weight component will be present in an amount from 10 to 90, preferably from 30 to 70, most preferably from 35 to 65 weight % of the total bimodal resin. The high molecular weight component may be present in amounts from 90 to 10, preferably 70 to 30, most preferably from about 65 to 35 weight % of the total polymer.

The low molecular weight polyethylene component may have a weight average molecular weight greater than 5,000, typically from 10,000 to 140,000, preferably from about 15,000 to about 100,000, most preferably from about 20,000 to 100,000 as estimated by deconvolution of a GPC curve. The low molecular weight polyethylene may have a polydispersity (Mw/Mn) greater than about 3, typically from 3 to 15, preferably from about 5 to 12.

The high molecular weight polyethylene component may have a weight average molecular weight greater than 200,000, typically from 250,000 to 800,000 as determined by deconvolution of a GPC plot. The high molecular weight polyethylene may have a polydispersity (Mw/Mn) less than about 10, typically from 2 to 8.

The resins of the present invention are suitable for use in a number of applications including film (blown and cast), extruded articles such as pipe (for potable water or for gas), rotomolded articles, injection molded articles and blow molded articles.

The catalyst system of the present invention may be supported on an inorganic or refractory support, including for example alumina, silica and clays or modified clays or an organic support (including polymeric support such as polystyrene or cross-linked polystyrene). The catalyst support may be a combination of the above components. However, preferably both catalyst components are supported on the same inorganic support or an organic support (e.g. polymeric) or mixed support. Some refractories include silica which may be treated to reduce surface hydroxyl groups and alumina. The support or carrier may be a spray-dried silica. Generally the support will have an average particle size from about 0.1 to about 1,000, preferably from about 10 to 150 microns. The support typically will have a surface area of at least about 10 m²/g, preferably from about 150 to 1,500 m²/g. The pore volume of the support should be at least 0.2, preferably from about 0.3 to 5.0 ml/g.

Generally the refractory or inorganic support may be heated at a temperature of at least 200° C. for up to 24 hours, typically at a temperature from 500° C. to 800° C. for about 2 to 20, preferably 4 to 10 hours. The resulting support will be essentially free of adsorbed water (e.g. less than about 1 weight %) and may have a surface hydroxyl content from about 0.1 to 5 mmol/g of support, preferably from 0.5 to 3 mmol/g.

A silica suitable for use in the present invention has a high surface area and is amorphous. For example, commercially available silicas are marketed under the trademark of Sylopol® 958 and 955 by the Davison Catalysts, a Division of W.R. Grace, and Company and ES-70W by Ineos Silica.

The amount of the hydroxyl groups in silica may be determined according to the method disclosed by J. B. Peri and A. L. Hensley, Jr., in *J. Phys. Chem.*, 72 (8), 2926, 1968, the entire contents of which are incorporated herein by reference.

While heating is the most preferred means of removing OH groups inherently present in many carriers, such as silica, the OH groups may also be removed by other removal means, such as chemical means. For example, a desired proportion of OH groups may be reacted with a suitable chemical agent, such as a hydroxyl reactive aluminum compound (e.g. triethyl aluminum) or a silane compound. This method of treatment has been disclosed in the literature and two relevant examples are: U.S. Pat. No. 4,719,193 to Levine in 1988 and by Noshay A. and Karol F. J. in *Transition Metal Catalyzed Polymerizations*, Ed. R. Quirk, 396, 1989. For example the support may be treated with an aluminum compound of the formula $Al((O)_aR^1)_bX_{3-b}$ wherein a is either 0 or 1, b is an integer from 0 to 3, $R^1$ is a $C_{1-8}$ alkyl radical, and X is a chlorine atom. The amount of aluminum compound is such that the amount of aluminum on the support prior to adding the remaining catalyst components will be from about 0 to 2.5 weight %, preferably from 0 to 2.0 weight % based on the weight of the support.

The clay type supports are also preferably treated to reduce adsorbed water and surface hydroxyl groups. However, the clays may be further subject to an ion exchange process which may tend to increase the separation or distance between the adjacent layers of the clay structure.

The polymeric support may be cross linked polystyrene containing up to about 50 weight %, preferably not more than 25 weight %, most preferably less than 10 weight % of a cross linking agent such as divinyl benzene.

In accordance with one embodiment of the present invention the two catalysts may be deposited on the same support (i.e. preferably both catalysts should be on each particle of support). The catalysts may be used in a broad molar ratio to achieve the required molecular weight distribution. For example the catalysts could be used in a molar ratio of the active transition metal of the first catalyst to the second catalyst from 95:5 to 5:95, typically 80:20 to 20:80 generally from 60:40 to 40:60.

In accordance with the present invention the first catalyst comprises a catalyst of the formula I:

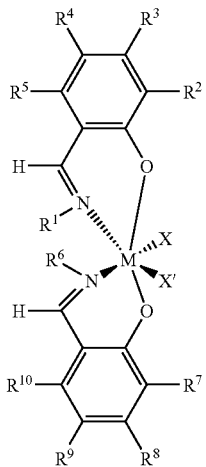

wherein M is a group 4 transition metal, preferably Zr or Ti; $R^1$ and $R^6$ are independently selected from the group consisting of $C_{1-6}$ alkyl or $C_{6-10}$ aryl radicals, preferably cyclohexyl radicals; $R^2$ and $R^7$ are independently selected from the group consisting of $C_{3-5}$ secondary or tertiary alkyl radicals, preferably t-butyl radicals; $R^3$, $R^4$, $R^5$, $R^8$, $R^9$ and $R^{10}$ are independently selected from the group consisting of a hydrogen atom, $C_{1-4}$ alkyl radicals, $C_{6-10}$ aryl radicals, $C_1$-$C_4$ alkoxy radicals, which substituents have a Hammett $\sigma_p$ value of less than 0.2; and X and X' are selected from the group consisting of a halogen atom, $C_{1-4}$ alkyl radicals, $C_{7-12}$ arylalkyl radicals, $C_{6-10}$ phenoxy radicals, amido radicals which may be substituted by up to two $C_{1-4}$ alkyl radicals and $C_{1-4}$ alkoxy radicals; preferably, a chlorine atom, a methyl radical, an ethyl radical and a benzyl radical.

In the first catalyst (first component) preferably $R^4$ and $R^9$ are selected from the group consisting of a $C_1$-$C_4$ alkoxy radical, most preferably methoxy radicals and $R^3$, $R^5$, $R^8$ and $R^{10}$ are hydrogen.

As noted above none of $R^3$, $R^4$, $R^5$, $R^8$, $R^9$ and $R^{10}$ has a Hammett $\sigma_p$ value (Hansch et al., Chem Rev. 1991, 91, 165) greater than 0.2.

The synthesis of desired ligands of the first catalyst can be accomplished by reaction of salicylaldehydes with amines. Preparation of the requisite salicylaldehydes can be accomplished using standard synthetic techniques.

Metallation of the ligands can be accomplished by reaction with basic reagents for example $Zr(CH_2Ph)_4$. Reaction of the ligands with $Zr(CH_2Ph)_4$ occurs with elimination of toluene. Alternately, ligands can be deprotonated with reagents such as BuLi, KH or Na metal and then reacted with metal halides, for example $ZrCl_4$.

The second component of the catalyst system (second catalyst) is a bulky ligand single site catalyst of the formula II:

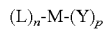

wherein M is selected from the group consisting of Ti, Zr and Hf; L is a monoanionic ligand independently selected from the group consisting of cyclopentadienyl-type ligands, and a bulky heteroatom ligand containing not less than five atoms in total (typically of which at least 20%, preferably at least 25% numerically are carbon atoms) and further containing at least one heteroatom selected from the group consisting of boron, nitrogen, oxygen, phosphorus, sulfur and silicon said bulky heteroatom ligand being sigma or pi-bonded to M; Y is independently selected from the group consisting of activatable ligands; n may be from 1 to 3; and p may be from 1 to 3, provided that the sum of n+p equals the valence state of M, and further provided that two L ligands may be bridged.

Non-limiting examples of bridging group include bridging groups containing at least one Group 13 to 16 atom, often referred to a divalent moiety such as but not limited to at least one of a carbon, oxygen, nitrogen, silicon, boron, germanium and tin atom or a combination thereof. Preferably, the bridging group contains a carbon, silicon or germanium atom, most preferably at least one silicon atom or at least one carbon atom. The bridging group may also contain substituent radicals as defined above including halogens.

Some bridging groups include but are not limited to, a di $C_{1-6}$ alkyl radical (e.g. alkylene radical for example an ethylene bridge), di $C_{6-10}$ aryl radical (e.g. a benzyl radical having two bonding positions available), silicon or germanium radicals substituted by one or more radicals selected from the group consisting of $C_{1-6}$ alkyl, $C_{6-10}$ aryl, phosphine or amine radical which are unsubstituted or up to fully substituted by one or more $C_{1-6}$ alkyl or $C_{6-10}$ aryl radicals, or a hydrocarbyl radical such as a $C_{1-6}$ alkyl radical or a $C_{6-10}$ arylene (e.g. divalent aryl radicals); divalent $C_{1-6}$ alkoxide radicals (e.g. —$CH_2CHOH$ $CH_2$—) and the like.

Exemplary of the silyl species of bridging groups are dimethylsilyl, methylphenylsilyl, diethylsilyl, ethylphenylsilyl, diphenylsilyl bridged compounds. Most preferred of the bridged species are dimethylsilyl, diethylsilyl and methylphenylsilyl bridged compounds.

Exemplary hydrocarbyl radicals for bridging groups include methylene, ethylene, propylene, butylene, phenylene and the like, with methylene being preferred.

Exemplary bridging amides include dimethylamide, diethylamide, methylethylamide, di-t-butylamide, diisopropylamide and the like.

The term "cyclopentadienyl" refers to a 5-member carbon ring having delocalized bonding within the ring and typically being bound to the active catalyst site, generally a group 4 metal (M) through $\eta^5$-bonds. The cyclopentadienyl ligand may be unsubstituted or up to fully substituted with one or more substituents selected from the group consisting of $C_{1-10}$ hydrocarbyl radicals in which hydrocarbyl substituents are unsubstituted or further substituted by one or more substituents selected from the group consisting of a halogen atom and a $C_{1-4}$ alkyl radical; a halogen atom; a $C_{1-8}$ alkoxy radical; a $C_{6-10}$ aryl or aryloxy radical; an amido radical which is unsubstituted or substituted by up to two $C_{1-8}$ alkyl radicals; a phosphido radical which is unsubstituted or substituted by up to two $C_{1-8}$ alkyl radicals; silyl radicals of the formula —Si—$(R)_3$ wherein each R is independently selected from the group consisting of hydrogen, a $C_{1-8}$ alkyl or alkoxy radical, and $C_{6-10}$ aryl or aryloxy radicals; and germanyl radicals of the formula Ge—$(R)_3$ wherein R is as defined above.

Typically the cyclopentadienyl-type ligand is selected from the group consisting of a cyclopentadienyl radical, an indenyl radical and a fluorenyl radical where the radicals are unsubstituted or up to fully substituted by one or more substituents selected from the group consisting of a fluorine atom, a chlorine atom; $C_{1-4}$ alkyl radicals; and a phenyl or benzyl radical which is unsubstituted or substituted by one or more fluorine atoms.

In the formula above if none of the L ligands is bulky heteroatom ligand then the catalyst could be a mono cyclopentadienyl (Cp) catalyst, a bridged bis Cp catalyst (a traditional metallocene) or a bridged constrained geometry type catalyst or a tris Cp catalyst.

If the second catalyst component contains one or more bulky heteroatom ligands the catalyst would have the formula:

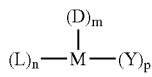

wherein M is a transition metal selected from the group consisting of Ti, Hf and Zr; D is independently a bulky heteroatom ligand (as described below); L is a monoanionic ligand selected from the group consisting of cyclopentadienyl-type ligands; Y is independently selected from the group consisting of activatable ligands; m is 1 or 2; n is 0 or 1; and p is an integer and the sum of m+n+p equals the valence state of M, provided that when m is 2, D may be the same or different bulky heteroatom ligands.

For example, the catalyst may be a bis (phosphinimine), or a mixed phosphinimine ketimide dichloride complex of titanium, zirconium or hafnium. Alternately, the catalyst could contain one phosphinimine ligand or one ketimide ligand, one "L" ligand (which is most preferably a cyclopentadienyl-type ligand) and two "Y" ligands (which are preferably both chloride).

The preferred metals (M) are from Group 4 (especially titanium, hafnium or zirconium) with titanium being most preferred. In one embodiment the catalysts are group 4 metal complexes in the highest oxidation state.

Bulky heteroatom ligands (D) include but are not limited to phosphinimine ligands and ketimide (ketimine) ligands.

In a further embodiment, the catalyst may contain one or two phosphinimine ligands (Pl) which are bonded to the metal and the second catalyst has the formula:

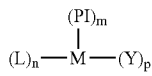

wherein M is a group 4 metal; Pl is a phosphinimine ligand; L is a monoanionic ligand selected from the group consisting of a cyclopentadienyl-type ligand; Y is independently selected from the group consisting of activatable ligands; m is 1 or 2; n is 0 or 1; p is an integer and the sum of m+n+p equals the valence state of M.

The phosphinimine ligand is defined by the formula:

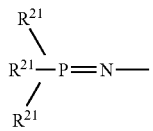

wherein each $R^{21}$ is independently selected from the group consisting of a hydrogen atom; a halogen atom; $C_{1-20}$, preferably $C_{1-10}$ hydrocarbyl radicals which are unsubstituted by or further substituted by a halogen atom; a $C_{1-8}$ alkoxy radical; a $C_{6-10}$ aryl or aryloxy radical; an amido radical; a silyl radical of the formula:

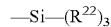

wherein each $R^{22}$ is independently selected from the group consisting of hydrogen, a $C_{1-8}$ alkyl or alkoxy radical, and $C_{6-10}$ aryl or aryloxy radicals; and a germanyl radical of the formula:

wherein $R^{22}$ is as defined above.

The preferred phosphinimines are those in which each $R^{21}$ is a hydrocarbyl radical, preferably a $C_{1-6}$ hydrocarbyl radical.

Suitable phosphinimine catalysts are Group 4 organometallic complexes which contain one phosphinimine ligand (as described above) and one ligand L which is either a cyclopentadienyl-type ligand or a heteroatom ligand.

As used herein, the term "ketimide ligand" refers to a ligand which:

(a) is bonded to the transition metal via a metal-nitrogen atom bond;

(b) has a single substituent on the nitrogen atom (where this single substituent is a carbon atom which is doubly bonded to the N atom); and (c) has two substituents Sub 1 and Sub 2 (described below) which are bonded to the carbon atom.

Conditions a, b and c are illustrated below:

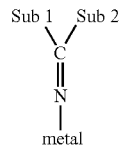

The substituents "Sub 1" and "Sub 2" may be the same or different. Exemplary substituents include hydrocarbyls having from 1 to 20, preferably from 3 to 6, carbon atoms, silyl groups (as described below), amido groups (as described below) and phosphido groups (as described below). For reasons of cost and convenience it is preferred that these substituents both be hydrocarbyls, especially simple alkyls and most preferably tertiary butyl. "Sub 1" and "Sub 2" may be the same or different and can be bonded to each other to form a ring.

Suitable ketimide catalysts are Group 4 organometallic complexes which contain one ketimide ligand (as described above) and one ligand L which is either a cyclopentadienyl-type ligand or a heteroatom ligand.

The term bulky heteroatom ligand (D) is not limited to phosphinimine or ketimide ligands and includes ligands which contain at least one heteroatom selected from the group consisting of boron, nitrogen, oxygen, phosphorus, sulfur and silicon. The heteroatom ligand may be sigma or pi-bonded to the metal. Exemplary heteroatom ligands include silicon-containing heteroatom ligands, amido ligands, alkoxy ligands, boron heterocyclic ligands and phosphole ligands, as all described below.

Silicon containing heteroatom ligands are defined by the formula:

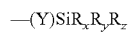

wherein the — denotes a bond to the transition metal and Y is sulfur or oxygen.

The substituents on the Si atom, namely $R_x$, $R_y$ and $R_z$ are required in order to satisfy the bonding orbital of the Si atom. The use of any particular substituent $R_x$, $R_y$ or $R_z$ is not especially important to the success of this invention. It is preferred that each of $R_x$, $R_y$ and $R_z$ is a $C_{1-2}$ hydrocarbyl group (i.e. methyl or ethyl) simply because such materials are readily synthesized from commercially available materials.

The term "amido" is meant to convey its broad, conventional meaning. Thus, these ligands are characterized by (a) a metal-nitrogen bond; and (b) the presence of two substituents (which are typically simple alkyl or silyl groups) on the nitrogen atom.

The terms "alkoxy" and "aryloxy" is also intended to convey its conventional meaning. Thus, these ligands are characterized by (a) a metal oxygen bond; and (b) the presence of a hydrocarbyl group bonded to the oxygen atom. The hydrocarbyl group may be a $C_{1-10}$ straight chained, branched or cyclic alkyl radical or a $C_{6-13}$ aromatic radical where the radicals are unsubstituted or further substituted by one or more $C_{1-4}$ alkyl radicals (e.g. 2,6 di-tertiary butyl phenoxy).

Boron heterocyclic ligands are characterized by the presence of a boron atom in a closed ring ligand. This definition includes heterocyclic ligands which also contain a nitrogen atom in the ring. These ligands are well known to those skilled in the art of olefin polymerization and are fully described in the literature (see, for example, U.S. Pat. Nos. 5,637,659; 5,554,775; and the references cited therein).

The term "phosphole" is also meant to convey its conventional meaning. "Phospholes" are cyclic dienyl structures having four carbon atoms and one phosphorus atom in the closed ring. The simplest phosphole is $C_4H_4$ (which is analogous to cyclopentadiene with one carbon in the ring being replaced by phosphorus). The phosphole ligands may be substituted with, for example, $C_{1-20}$ hydrocarbyl radicals (which may, optionally, contain halogen substituents); phosphido radicals; amido radicals; or silyl or alkoxy radicals. Phosphole ligands are also well known to those skilled in the art of olefin polymerization and are described as such in U.S. Pat. No. 5,434,116 (Sone, to Tosoh).

In one embodiment the second catalyst may contain no phosphinimine ligands as the bulky heteroatom ligand. The bulky heteroatom containing ligand may be selected from the group consisting of ketimide ligands, silicon-containing heteroatom ligands, amido ligands, alkoxy ligands, boron heterocyclic ligands and phosphole ligands. In such catalysts the Cp ligand may be present or absent.

The preferred metals (M) are from Group 4 (especially titanium, hafnium or zirconium), with titanium being most preferred.

The catalyst systems (e.g. first and second catalyst) in accordance with the present invention may be activated with an activator selected from the group consisting of:

(i) a complex aluminum compound of the formula $R^{12}{}_2AlO(R^{12}AlO)_mAlR^{12}{}_2$ wherein each $R^{12}$ is independently selected from the group consisting of $C_{1-20}$ hydrocarbyl radicals and m is from 3 to 50, and optionally a hindered phenol to provide a molar ratio of Al:hindered phenol from 2:1 to 5:1 if the hindered phenol is present;

(ii) ionic activators selected from the group consisting of:

(A) compounds of the formula $[R^{13}]^+[B(R^{14})_4]^-$ wherein B is a boron atom, $R^{13}$ is a cyclic $C_{5-7}$ aromatic cation or a triphenyl methyl cation and each $R^{14}$ is independently selected from the group consisting of phenyl radicals which are unsubstituted or substituted with a hydroxyl group or with 3 to 5 substituents selected from the group consisting of a fluorine atom, a $C_{1-4}$ alkyl or alkoxy radical which is unsubstituted or substituted by a fluorine atom; and a silyl radical of the formula $—Si—(R^{15})_3$; wherein each $R^{15}$ is independently selected from the group consisting of a hydrogen atom and a $C_{1-4}$ alkyl radical; and (B) compounds of the formula $[(R^{18})_tZH]^+[B(R^{14})_4]^-$ wherein B is a boron atom, H is a hydrogen atom, Z is a nitrogen atom or phosphorus atom, t is 2 or 3 and $R^{18}$ is independently selected from the group consisting of $C_{1-18}$ alkyl radicals, a phenyl radical which is unsubstituted or substituted by up to three $C_{1-4}$ alkyl radicals, or one $R^{18}$ taken together with the nitrogen atom may form an anilinium radical and $R^{14}$ is as defined above; and (C) compounds of the formula $B(R^{14})_3$ wherein $R^{14}$ is as defined above; and (iii) mixtures of (i) and (ii).

Preferably the activator is a complex aluminum compound of the formula $R^{12}{}_2AlO(R^{12}AlO)_mAlR^{12}{}_2$ wherein each $R^{12}$ is independently selected from the group consisting of $C_{1-20}$ hydrocarbyl radicals and m is from 3 to 50, and optionally a hindered phenol to provide a molar ratio of Al:hindered phenol from 2:1 to 5:1 if the hindered phenol is present. In the aluminum compound preferably, $R^{12}$ is methyl radical and m is from 10 to 40. The preferred molar ratio of Al:hindered phenol, if it is present, is from 3.25:1 to 4.50:1. Preferably the phenol is substituted in the 2, 4 and 6 position by a $C_2$-6 alkyl radical. Desirably the hindered phenol is 2,6-di-tert-butyl-4-ethyl-phenol.

The aluminum compounds (alumoxanes and optionally hindered phenol) are typically used as activators in substantial molar excess compared to the amount of metal in the catalyst. Aluminum:transition metal molar ratios of from 10:1 to 10,000:1 are preferred, most preferably 10:1 to 500:1 especially from 40:1 to 120:1.

Ionic activators are well known to those skilled in the art. The "ionic activator" may abstract one activatable ligand so as to ionize the catalyst center into a cation, but not to covalently bond with the catalyst and to provide sufficient distance between the catalyst and the ionizing activator to permit a polymerizable olefin to enter the resulting active site.

Examples of ionic activators include:
triethylammonium tetra(phenyl)boron,
tripropylammonium tetra(phenyl)boron,
tri(n-butyl)ammonium tetra(phenyl)boron,
trimethylammonium tetra(p-tolyl)boron,
trimethylammonium tetra(o-tolyl)boron,
tributylammonium tetra(pentafluorophenyl)boron,
tripropylammonium tetra(o,p-dimethylphenyl)boron,
tributylammonium tetra(m,m-dimethylphenyl)boron,
tributylammonium tetra(p-trifluoromethylphenyl)boron,
tributylammonium tetra(pentafluorophenyl)boron,
tri(n-butyl)ammonium tetra(o-tolyl)boron,
N,N-dimethylanilinium tetra(phenyl)boron,
N,N-diethylanilinium tetra(phenyl)boron,
N,N-diethylanilinium tetra(phenyl)-butylboron,
di-(isopropyl)ammonium tetra(pentafluorophenyl)boron,
dicyclohexylammonium tetra(phenyl)boron,
triphenylphosphonium tetra(phenyl)boron,
tri(methylphenyl)phosphonium tetra(phenyl)boron,
tri(dimethylphenyl)phosphonium tetra(phenyl)boron,
tropillium tetrakispentafluorophenyl borate,
triphenylmethylium tetrakispentafluorophenyl borate,
tropillium phenyltrispentafluorophenyl borate,
triphenylmethylium phenyltrispentafluorophenyl borate, benzene (diazonium) phenyltrispentafluorophenyl borate,
tropillium tetrakis (2,3,5,6-tetrafluorophenyl) borate,
triphenylmethylium tetrakis (2,3,5,6-tetrafluorophenyl) borate,
tropillium tetrakis (3,4,5-trifluorophenyl) borate,
benzene (diazonium) tetrakis (3,4,5-trifluorophenyl) borate,
tropillium tetrakis (1,2,2-trifluoroethenyl) borate,
triphenylmethylium tetrakis (1,2,2-trifluoroethenyl) borate,
tropillium tetrakis (2,3,4,5-tetrafluorophenyl) borate, and
triphenylmethylium tetrakis (2,3,4,5-tetrafluorophenyl) borate.

Readily commercially available ionic activators include:
N,N-dimethylaniliniumtetrakispentafluorophenyl borate;
triphenylmethylium tetrakispentafluorophenyl borate (tritylborate); and
trispentafluorophenyl borane.

Ionic activators may also have an anion containing at least one group comprising an active hydrogen or at least one of any substituent able to react with the support. As a result of these reactive substituents, the ionic portion of these ionic activators may become bonded to the support under suitable conditions. One non-limiting example includes ionic activators with tris (pentafluorophenyl) (4-hydroxyphenyl) borate as the anion. These tethered ionic activators are more fully described in U.S. Pat. Nos. 5,834,393; 5,783,512; and 6,087,293.

Suitable linking substituents, E, on compatible anions used with unmodified inorganic oxides or with inorganic oxide containing only residual hydroxyl functionality, include moieties bearing silane, siloxane, hydrocarbyloxysilane, halosilane, amino, carboxylic acid, carboxylic acid ester, aldehyde, ketone or epoxide functionality, containing from 1 to $1 \times 10^6$ non-hydrogen atoms, more preferably from 2 to 1,000 non-hydrogen atoms, and most preferably 4 to 20 non-hydrogen atoms. In practice, use of silane containing compatible anions may require use of a base catalyst, such as a tri($C_{1-4}$ alkyl)amine, to effect the reaction with a substrate containing only residual hydroxyl functionality. Preferably E for use with such unmodified inorganic oxide compounds is a silane or chlorosilane substituted hydrocarbyl radical. Preferred linking substituents, E, include silyl-substituted aryl, silyl-substituted aralkyl, silyl-substituted alkaryl, silyl-substituted alkyl, silyl-substituted haloaryl, or silyl-substituted haloalkyl groups, including polymeric linking groups, most preferably p-silylphenyl (—$C_6H_4SiH_3$), p-silyltetrafluorophenyl (—$C_6F_4SiH_3$), silylnaphthyl (—$C_{10}H_8SiH_3$), silylperfluoronaphthyl (—$C_{10}F_8SiH_3$), and 2-silyl-1-ethyl (—$C_2H_4SiH_3$), groups.

Suitable linking substituents, E, on compatible anions used with inorganic oxides that have been modified with reactive silane functionality include moieties bearing silane, siloxane, hydrocarbyloxysilane, halosilane, hydroxyl, thiol, amino, carboxylic acid, carboxylic acid ester, aldehyde, ketone or epoxide functionality containing from 1 to $1 \times 10^6$ non-hydrogen atoms, more preferably from 2 to 1,000 non-hydrogen atoms, and most preferably 4 to 20 non-hydrogen atoms. Preferably E, in such circumstances is a hydroxyl substituted hydrocarbyl radical, more preferably a hydroxy-substituted aryl, hydroxy-substituted aralkyl, hydroxy-substituted alkaryl, hydroxy-substituted alkyl, hydroxy-substituted haloaryl, or hydroxy-substituted haloalkyl group including polymeric linking groups, most preferably hydroxyphenyl, hydroxytolyl, hydroxybenzyl, hydroxynaphthyl, hydroxybisphenyl, hydroxycyclohexyl, $C_{1-4}$ hydroxyalkyl, and hydroxy-polystyryl groups, or fluorinated derivatives thereof. A most preferred linking substituent, E, is a p-hydroxyphenyl, 4-hydroxybenzyl, 6-hydroxy-2-naphthyl group, 4-(4'-hydroxyphenyl)phenyl, 4-((4'-hydroxyphenyl)dimethylmethylene)phenyl, or fluorinated derivatives thereof. A base catalyst, such as a tri($C_{1-4}$ alkyl)amine, may also be used to assist in the reaction with the substrate.

Most highly preferably, E is one of the foregoing hydroxy substituted substituents used in combination with a reactive silane functionalized silica.

The ionic activators may be used in amounts to provide a molar ratio of transition metal to boron will be from 1:1 to 1:6, preferably from 1:1 to 1:2.

As noted above, the reaction mixture in a gas phase process typically comprises from 0 to 15 mole % of hydrogen, from 0 to 30 mole % of one or more $C_{3-8}$ alpha-olefins, from 15 to 100 mole % of ethylene, and from 0 to 75 mole % of one or more non-reactive gases. The non-reactive gases may be selected from the group consisting of nitrogen and a $C_{1-7}$ non-polymerizable hydrocarbon such as an alkane (e.g. butane, isopentane and the like).

In accordance with the present invention applicants have found that it is possible to control the molecular weight distribution of a bimodal resin (e.g. the ratio of the high molecular weight fraction to the low molecular weight fraction) and optionally the comonomer placement or distribution in a bimodal resin produced in a single gas or slurry phase reactor in the presence of a mixed catalyst system on the same or different supports by controlling one or more steps selected from the group consisting of:

(a) altering the temperature of the reaction by at least 2° C. within the range from 50 to 120° C. for a gas phase polymerization and within the range from 20 to 150° C. for a slurry phase polymerization;

(b) altering the partial pressure of the hydrogen component of the reaction mixture by at least 0.02 psi (0.138 KPa);

(c) altering the partial pressure of one or more monomers (e.g. ethylene) in the reaction mixture by not less than 10 psi (68.94 KPa); and (d) altering the amount of non polymerizable hydrocarbon in the gas phase reaction mixture by not less than 0.5 mole %.

The reaction may take place in a single gas phase or slurry phase reactor. The product is removed from the reactor by conventional means and degassed and further treated.

The resulting resin may typically be compounded either by the manufacturer or the converter (e.g. the company converting the resin pellets into the final product). The blend may contain fillers, pigments and other additives. Typically the fillers are inert additives such as clay, talc, $TiO_2$ and calcium carbonate which may be added to the polyolefin in amounts from 0 weight % up to about 50 weight %, preferably less than 30 weight %. The resin may contain typical amounts of antioxidants and heat and light stabilizers such as combinations of hindered phenols and one or more of phosphates, phosphites and phosphonites typically in amounts of less than 0.5 weight % based on the weight of the resin. Pigments such as carbon black may also be added to the resin in small amounts.

In the manufacture of pipe and other products, the polyethylene resin blend may contain a nucleating agent in amounts from about 1,500 to about 10,000 parts per million (ppm) based on the weight of the polyolefin. Preferably the nucleating agent is used in amounts from 2,000 to 8,000 ppm, most preferably from 2,000 to 5,000 ppm based on the weight of the polyolefin.

The nucleating agent may be selected from the group consisting of dibenzylidene sorbitol, di(p-methyl benzylidene) sorbitol, di(o-methyl benzylidene) sorbitol, di(p- ethylbenzylidene) sorbitol, bis(3,4-dimethyl benzylidene) sorbitol, bis(3,4-diethylbenzylidene) sorbitol and bis(trimethylbenzylidene) sorbitol. One commercially available nucleating agent is bis(3,4-dimethyl benzylidene) sorbitol.

The polymers made by the process of the present invention are useful in conventional applications for polyolefins including films, both blown and cast, injection molding, blow molding and rotomolding.

For pipe applications desirably the polymer should have the following characteristics:

ASTM D638 tensile stress at yield equal or greater than 23 MPa.

ASTM F2231-02: Charpy Impact test energy >0.6 J (With this property, the material should exhibit excellent Rapid Crack Propagation (RCP) resistance if tested according to ISO RCP tests 13477 (S4 RCP test) and 13478 (Full Scale RCP test).).

ASTM F1473 (Slow Crack Growth resistance test) PENT test at 2.4 MPa at 80° C.>1,000 hours.

Hydrostatic Properties:

ASTM D2837: HDB (Hydrostatic Design Basis) at 23° C. 1600 psi, and meet the 50-years substantiation requirement according to PPI (Plastic Pipe Institute) TR-3 2004.

ASTM D2837: HDB (Hydrostatic Design Basis) at 60° C. 1,000 psi.

ASTM D1598: no ductile and brittle failure at greater than 7,000 hours at both test conditions of hoop stress 740 psi/temperature 80° C., and hoop stress 690 psi/temperature 90° C. hydrostatic test at hoop.

With these hydrostatic test results, the material would meet the PE100 requirements if it was tested according to the ISO standards ISO 12162 and ISO 9080.

The polymer could have an $I_{21}/I_5$ from about 7 to 35.

Processability: The material should possesses excellent melt strength for production of large diameter pipes of 12 inches or larger without sagging of the melt as it exits the die.

The polymer should have a melt strength of 10 cN determined using a Rosand Capillary Rheometer.

Test Conditions:
 Barrel Temperature: 230° C.
 Die: 2-mm Diameter, L/D=20
 Pressure Transducer: 10,000 psi (68.95 MPa)
 Piston Speed: 5.33 mm/min
 Haul-off Angle: 52°
 Haul-off incremental speed: 500 m/(min)$^2$ For film products the polymer should have the following properties as determined by the appropriate ASTM test method.

$I_{21}$ less than 25, typically from 5 to 20, preferably from 8 to 15 dg/min.

MD Tensile strength of from about 7,000 to about 18,000 typically 10,000 to 15,000 psi.

TD Tensile strength of from about 7,000 to about 18,000 typically, 10,000 to 15,000 psi.

MD Tensile elongation of from about 220 to about 350%.

TD Tensile elongation of from about 220 to about 350%.

MD Elmendorf Tear value of from about 10 to about 30 g/mil.

TD Elmendorf Tear value of from about 20 to about 60 g/mil.

Dart Impact ($F_{50}$) of greater than 150 g.

For molding (injection, blow and extrusion) the following mechanical properties (as measured by the appropriate ASTM test method) may be desirable in the polymer.

Yield Point 25 to 40, preferably 25 to 35 MPa
Tensile Modulus 800 to 1000, preferably 800 to 900 MPa
Tensile Strength 20 to 45, preferably 25 to 40 MPa
Notch Impact 140 to 160, typically about 150 kJ/M$^2$
Flexural Strength 20 to 45, preferably 20 to 40 MPa
Shear Strength 20 to 45, preferably 20 to 36 MPa
Elongation at yield 10 to 15 typically 10 to 12%
Elongation at break 100 to 1200%

The present invention will now be illustrated by the following non-limiting examples.

EXAMPLES

Experimental

In the experiments the following abbreviations were used.
THF=tetrahydrofuran
TMS=trimethyl silyl Molecular weight distribution and molecular weight averages (Mw, Mn, Mz) of resins were determined using high temperature Gel Permeation Chromatography (GPC) according to the ASTM D6474: "Standard Test Method for Determining Molecular Weight Distribution and Molecular Weight Averages of Polyolefins". The system was calibrated using the 16 polystyrene standards (Mw/Mn<1.1) in Mw range $5\times10^3$ to $8\times10^6$ and 3 Hydrocarbon Standards $C_{60}$, $C_{40}$, and $C_{20}$.

The operating conditions are listed below:
GPC Instrument: Polymer Laboratories® 220 equipped with a refractive index detector
Software: Viscotek® DM 400 Data Manager with Trisec® software
Columns: 4 Shodex® AT-800/S series cross-linked styrene-divinylbenzene with pore sizes $10^3$ Å, $10^4$ Å, $10^5$ Å, $10^6$ Å
Mobile Phase: 1,2,4-trichlorobenzene
Temperature: 140° C.
Flow Rate: 1.0 ml/min
Sample Preparation: Samples were dissolved in 1,2,4-trichlorobenzene by heating on a rotating wheel for four hours at 150° C.
Sample Filtration: No
Sample Concentration: 0.1% (w/v)

The determination of branch frequency as a function of molecular weight was carried out using high temperature Gel Permeation Chromatography (GPC) and FT-IR of the eluent. Polyethylene standards with a known branch content, polystyrene and hydrocarbons with a known molecular weight were used for calibration.

Operating conditions are listed below:
GPC instrument: Waters® 150 equipped with a refractive index detector
IR Instrument: Nicolet Magna® 750 with a Polymer Labs® flow cell
Software: Omnic® 5.1 FT-IR
Columns: 4 Shodex® AT-800/S series cross-linked styrene-divinylbenzene with pore sizes $10^3$ Å, $10^4$ Å, $10^5$ Å, $10^6$ Å
Mobile Phase: 1,2,4-Trichlorobenzene
Temperature: 140° C.
Flow Rate: 1.0 ml/min
Sample Preparation: Samples were dissolved in 1,2,4-trichlorobenzene by heating on a rotating wheel for five hours at 150° C.
Sample Filtration: No
Sample Concentration: 4 mg/g Synthesis of Catalyst Component 1

EtMgBr (100 mL, 3M solution in diethyl ether) was added dropwise to a solution of 4-methoxy-2-tert-butyl-phenol (290 mmol) in tetrahydrofuran (THF) (350 mL) at ambient temperature to give an amber solution. After 2 hrs of stirring, toluene (250 mL) was added, and the ether and THF were removed by distillation. Triethylamine (60.6 mL) and paraformaldehyde (21.8 g) were then added as a white slurry in toluene. The reaction was stirred overnight, followed by heating for 2 hours at 95° C. to give a cloudy orange solution. The resulting reaction mixture was poured into 1M HCl while cooling to 0° C. The organic layer was separated and the aqueous phase extracted with diethyl ether. The combined organic phases were dried over $Na_2SO_4$, and then evaporated to give an oily orange material. The oil was dissolved in ethanol (250 mL) and to the clear orange solution was added cyclohexylamine (32.9 mL). The reaction was stirred for 48 hours giving a dark orange solution. The solution was cooled in a freezer causing a yellow crystalline solid to separate. The product was isolated by filtration and washed with cold ethanol. The imine product (54 mmol) was dissolved in THF (200 mL) and added dropwise to a stirring suspension of excess NaH (70 mmol) in THF (250 mL). The yellow suspension was stirred for 48 hours, the excess NaH removed by filtration and the solvent removed to give a bright yellow solid. The sodium salt (46 mmol) was dissolved in THF (150 mL) and added to a suspension of $ZrCl_4 \cdot THF_2$ (23 mmol) in THF (150 mL). The resulting yellow suspension was stirred for 48 hours. The solvent was removed giving impure product as a very sparingly soluble yellow residue. The crude material was extracted with several portions of $CH_2Cl_2$ followed by filtration and solvent removal to give a yellow solid which was further washed with cold $CH_2Cl_2$/ether to remove unreacted ligand.

Synthesis of $(tBu_3PN)(n-BuCpC_6F_5)TiCl_2$

Sodium cyclopentadiene (615 mmol) was dissolved in tetrahydrofuran and a solution of perfluorobenzene (309 mmol) was added as a 1:1 solution with THF over a 20 minute period. The resulting mixture was for 3 hours at 60° C., allowed to cool, then added by cannula transfer to neat chlorotrimethylsilane (60 mL) at 0° C. over 15 minutes. The reaction was allowed to warm to ambient temperature for 30 minutes, followed by slow concentration over a 3 hour period to remove excess chlorotrimethylsilane and solvents. The resulting wet solid was slurried in heptane and filtered. Concentration of the heptane filtrate gave crude (TMS)$(C_6F_5)C_5H_4$ as a brown oil which was used without further purification. (TMS)$(C_6F_5)C_5H_4$ (50 mmol) was dissolved in THF and cooled to 0° C. The solution was treated with n-BuLi (50 mmol), which was added dropwise. After stirring for 10 minutes at 0° C., the reaction was allowed to warm to ambient temperature and stirred for a further 1 hour. A cold solution of n-butyl bromide (50 mmol) was prepared in THF (35 mL), and to this was added the [(TMS)$(C_6F_5)C_5H_3$]Li solution. The resulting mixture was stirred for 2 hours and the THF was removed by evaporation under vacuum. The residue was extracted into heptane (150 mL), filtered and the solvent was evaporated. $TiCl_4$ (60 mmol) was added to the (n-Bu)(TMS)$(C_6F_5)C_5H_3$ via pipette and the solution was heated to 60° C. for 3 hours. Removal of excess $TiCl_4$ under vacuum gave a thick oil. Addition of pentane caused immediate precipitation of product ((nBu)$(C_6F_5)C_5H_3$)$TiCl_3$ which was isolated by filtration. ((nBu)$(C_6F_5)C_5H_3$)$TiCl_3$ (15.6 mmol) was mixed with $(tBu)_3PN$-TMS (15.6 mmol) in toluene and stirred overnight at ambient temperature. The solution was filtered and the solvent removed to give desired product.

Synthesis of $(tBu_3PN)(n$-HexylC$_6C_5Cp)TiCl_2$ (TMS)$(C_6F_5)C_5H_4$ (160 mmol, made as described above) was dissolved in THF and cooled to −40° C. The solution was treated with n-BuLi (160 mmol), which was added dropwise. After stirring for 10 minutes at 0° C., the reaction was allowed to warm to ambient temperature and stirred for a further 30 minutes. To a solution of n-hexyl bromide (240 mmol) in THF (100 mL) was added the [(TMS)$(C_6F_5)C_5H_3$] Li solution at 0° C. The resulting mixture was stirred overnight at room temperature and the volatiles were removed in vacuo. Vacuum distillation of the crude residue gave sufficiently pure (n-hexyl)(TMS)$(C_6F_5)C_5H_3$ for use in the next step. Neat $TiCl_4$ (48 mmol) was reacted with (n-hexyl)(TMS)$(C_6F_5)C_5H_3$ (40 mmol) at 60° C. After 3 hours, volatiles were removed and the residue was triturated with heptane to give (n-HexylC$_6F_5$Cp)$TiCl_3$ which was used directly in the next step. (n-HexylC$_6F_5$Cp)$TiCl_3$ (24 mmol) was weighed into a flask with $tBu_3PN$-TMS (18 mmol) and toluene (40 mL) was added. The mixture was stirred at 100° C. for 2.5 hours and the solvent was removed to give an oil. Heptane addition precipitated the desired product as a yellow powder which was isolated by filtration and washed further with heptane.

Preparation of Silica-Supported Aluminoxane (MAO)

Sylopol® XPO-2408 silica, purchased from Grace Davison, was calcined by fluidizing with air at 200° C. for 2 hours and subsequently with nitrogen at 600° C. for 6 hours. 44.6 grams of the calcined silica was added in 100 mL of toluene. 150.7 g of a MAO solution containing 4.5 weight % Al purchased from Albemarle was added to the silica slurry. The mixture was stirred for 1 hour at ambient temperature. The solvent was removed by vacuum, yielding a free flowing solid containing 11.5 weight % Al.

Example 1

Preparation of Catalyst A

In a glovebox, 1.37 g of silica-supported MAO prepared above was slurried in 25 mL of toluene. Separately, 18 mg of catalyst component 1 was dissolved in 10 mL of toluene, and 16 mg of $(tBu_3PN)(C_6F_5)(n$-Bu)CpTiCl$_2$ was dissolved in 10 mL of toluene. Both catalyst solutions were added simultaneously to the silica slurry. After one hour of stirring, the slurry was filtered, yielding a clear filtrate. The solid component was washed twice with toluene, and once with heptane. The final product was dried in vacuo to 300 mTorr (40 Pa) and stored under nitrogen until used.

Polymerization

A 2 L stirred autoclave reactor was heated at 100° C. for 1 hour and thoroughly purged with nitrogen. 160 g of NaCl, pre-dried in an oven at 160° C. for at least a week, was added in the reactor which was subsequently pressure purged three times with nitrogen and twice with ethylene at 100° C. The reactor was then cooled to 90° C. and an aliquot of 25 weight % triisobutyl aluminum (TiBAL) was added. The amount of TiBAL was such that the molar ratio of TiBAL to the total transition metal in the catalyst to be added was around 500:1. 2.0 mL of purified 1-hexene was then added and the reactor was pressurized with 100 psig (689.4 KPa gage) of ethylene. 200 psig (1,378 KPa gage) of ethylene was used to push 20.7 mg of Catalyst A from a catalyst tubing into the reactor to start the reaction. During the polymerization, the reactor pressure was maintained constant with 200 psig (1,378 KPa gage) of ethylene and 1-hexene was continuously fed into the reactor as 10 weight % of ethylene feeding rate using a mass flow controller. The polymerization was carried out at 90° C. for 1 hour, yielding 38.0 g of polymer.

Example 2

The procedure was the same as Example 1, except that 27.5 mg of Catalyst A was used for polymerization and 0.6 psi (4.1 KPa gage) of hydrogen was pre-charged to the reactor prior to polymerization, yielding 65.5 g of polymer.

The GPC profiles of the polymers produced in Examples 1 and 2 are shown in FIG. 1. In the absence of hydrogen, a polymer with bimodal MW distribution was produced. However, in the presence of hydrogen, the peak corresponding to the high MW fraction shifted to a lower MW, resulting in a unimodal polymer. Hence, by adjusting the level of hydrogen in the reactor, one can control the polydispersity of polymers, changing them from a unimodal distribution to a broad or bimodal distribution.

Example 3

Preparation of Catalyst B

In a glovebox, 137 g of silica-supported MAO prepared above was slurried in 400 mL of toluene. Separately, 2.26 g of catalyst component 1 was dissolved in 100 mL of toluene, and 1.24 g of $(tBu_3PN)(n\text{-}hexylC_6F_5Cp)TiCl_2$ was dissolved in 100 mL of toluene. Both catalyst solutions were added simultaneously to the silica slurry. After one hour of stirring, the slurry was filtered, yielding a clear filtrate. The solid component was washed twice with toluene, and once with heptane. The final product was dried in vacuo to 300 mTorr (40 Pa) and stored under nitrogen until use.

Polymerization

A 2 L stirred autoclave reactor was heated at 100° C. for 1 hr and thoroughly purged with nitrogen. 160 g of NaCl pre-dried in an oven at 160° C. for at least a week was added in the reactor which was subsequently pressure purged three times with nitrogen and twice with ethylene at 100° C. The reactor was then cooled to 83° C. and an aliquot of 25 weight % triisobutyl aluminum (TiBAL) was added. The amount of TiBAL was such that the molar ratio of TiBAL to the total transition metal in the catalyst to be added was around 500:1. 1.5 mL of purified 1-hexene was then added and the reactor was pressurized with 100 psig (689.4 KPa gage) of ethylene. 150 psig (1,034 KPa gage) of ethylene was used to push 30.9 mg of Catalyst B from a catalyst tubing into the reactor to start the reaction. During the polymerization, the reactor pressure was maintained constant with 150 psig (1,034 KPa gage) of ethylene and 1-hexene was continuously fed into the reactor as 10 weight % of ethylene feeding rate using a mass flow controller. The polymerization was carried out at 83° C. for 1 hour, yielding 37.1 g of polymer.

Example 4

Polymerization

A 2 L stirred autoclave reactor was heated at 100° C. for 1 hour and thoroughly purged with nitrogen. 160 g of NaCl pre-dried in an oven at 160° C. for at least a week was added in the reactor which was subsequently pressure purged three times with nitrogen and twice with ethylene at 100° C. The reactor was then cooled to 83° C. and an aliquot of 25 weight % triisobutyl aluminum (TiBAL) was added. The amount of TiBAL was such that the molar ratio of TiBAL to the total transition metal in the catalyst to be added was around 500:1. 2.0 mL of purified 1-hexene was then added and the reactor was pressurized with 100 psig (689.4 KPa gage) of ethylene. 200 psig (1,378 KPa gage) of ethylene was used to push 29.6 mg of Catalyst B from a catalyst tubing into the reactor to start the reaction. During the polymerization, the reactor pressure was maintained constant with 200 psig (1,378 KPa gage) of ethylene and 1-hexene was continuously fed into the reactor as 10 weight % of ethylene feeding rate using a mass flow controller. The polymerization was carried out at 83° C. for 1 hour, yielding 45.1 g of polymer.

Figure 2:
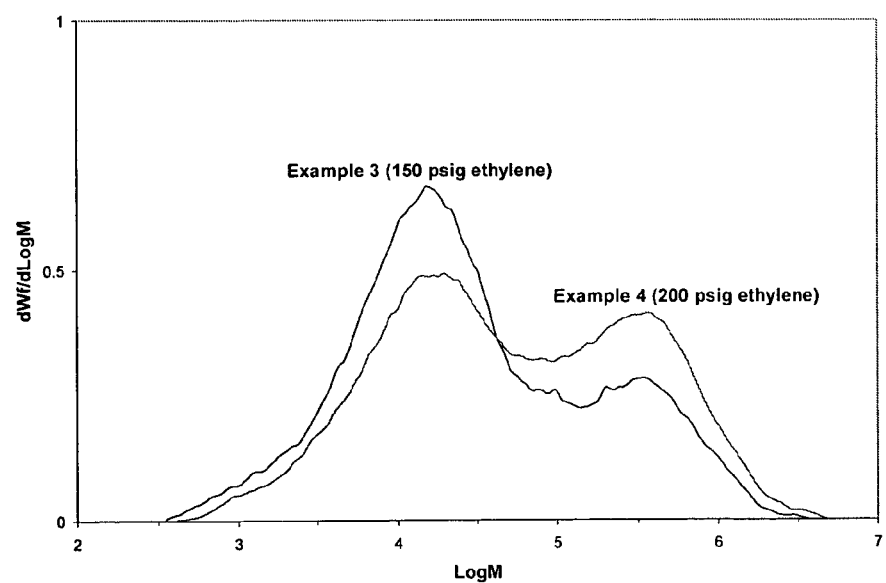
FIG. 2 shows the GPC profiles of the polymers produced in Examples 3 and 4.

FIG. 2 shows the GPC profiles of polymers produced by Examples 3 and 4. Due to the difference in the effect of ethylene pressure on the activity of each catalyst component, the same dual catalyst can produce resins with different molecular weight distribution profiles when operated under different ethylene pressures.

Example 5

Was carried out the same as Example 4, except that 29.9 mg of Catalyst B was used and the polymerization was conducted at 90° C., yielding 42.8 g of polymer.

Example 6

Was carried out the same as Example 4, except that 31.6 mg of Catalyst B was used and the polymerization was conducted at 97° C., yielding 50.9 g of polymer.

Figure 3:
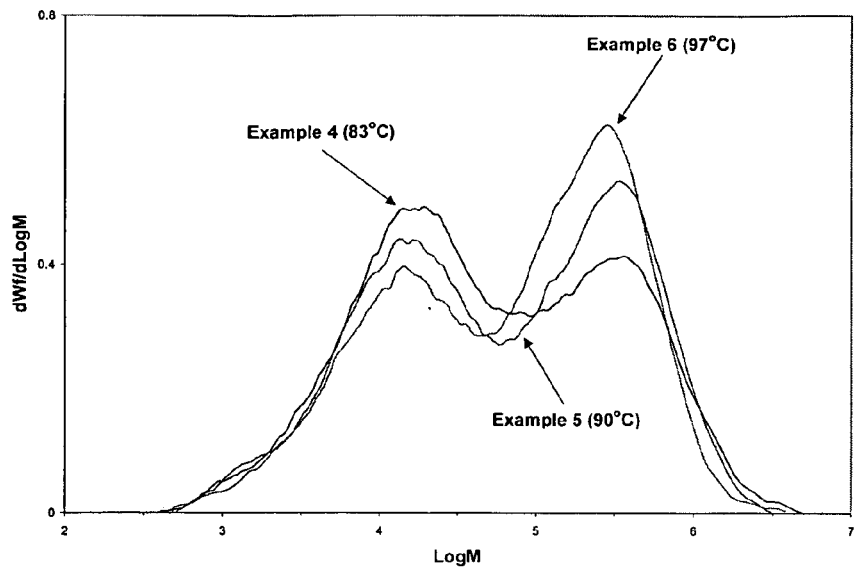
FIG. 3 shows the GPC profiles of the polymers produced in Examples 4, 5 and 6.

The GPC profiles of polymers produced in Examples 4-6 are shown in FIG. 3. It is clear that at higher temperature the ratio of the high MW fraction to the low MW fraction increases.

Example 7

Polymerization

A 75 L stirred bed gas phase continuous reactor similar to that described in EP 0659 773 was used to produce copolymers containing ethylene and hexene. The polymerization was run at 83° C. with ethylene and hexene using Catalyst B to obtain HDPE pipe bimodal resins. Isopentane was used in the process as a cooling agent as well as to control the molecular weight distribution of the resulting polymer. Nitrogen was used to maintain the total reactor pressure to approximately 2,100 kPa. The reactor composition was as follows: 55% ethylene, 0.41% hexene, 8.5% isopentane with the balance being nitrogen.

Figure 4:
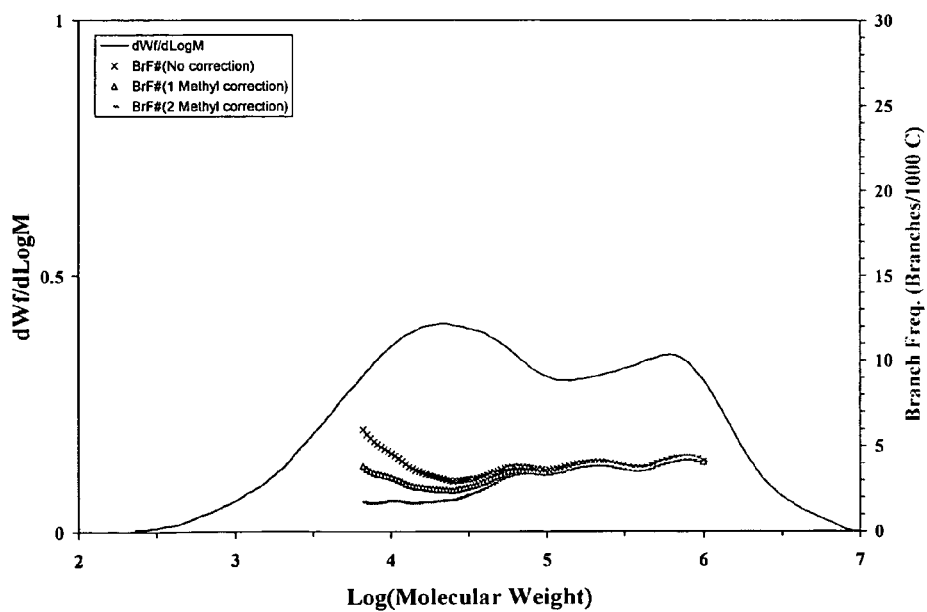
FIG. 4 shows the GPC-FTIR profiles of the polymer produced in Example 7.

FIG. 4 is a GPC-FTIR profile of the polymer produced in Example 7.

Example 8

Polymerization

Polymerization reaction was similar to Example 7 but with reactor temperature at 88° C.

Figure 5:
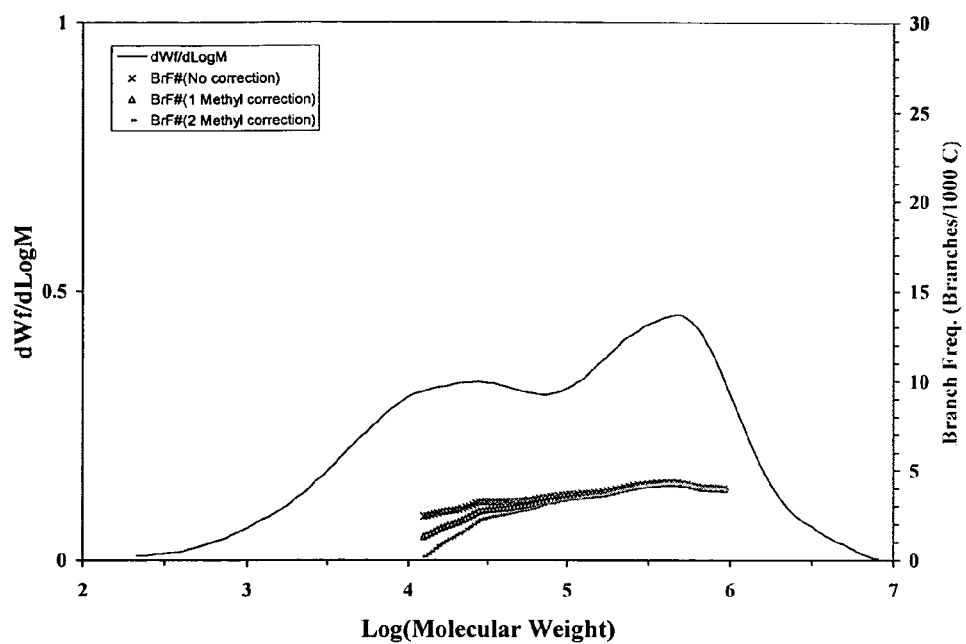
FIG. 5 shows the GPC-FTIR profiles of the polymer produced in Example 8.

FIG. 5 is as GPC-FTIR profile of the polymer produced in Example 8.

By comparing FIGS. 4 and 5, it can be seen that temperature effects are also present in a continuous operation mode on a larger scale reactor. At 88° C., the dual catalyst produces a resin with a higher ratio of high MW fraction to low MW fraction than a resin produced at 83° C. Furthermore, the resin produced at 88° C. exhibits increased comonomer incorporation into the high MW fraction relative to the resin obtained at 83° C.

Example 9

Example 9 was carried out the same as Example 7, except that isopentane was not fed into the reactor during the course of polymerization.

Figure 6:
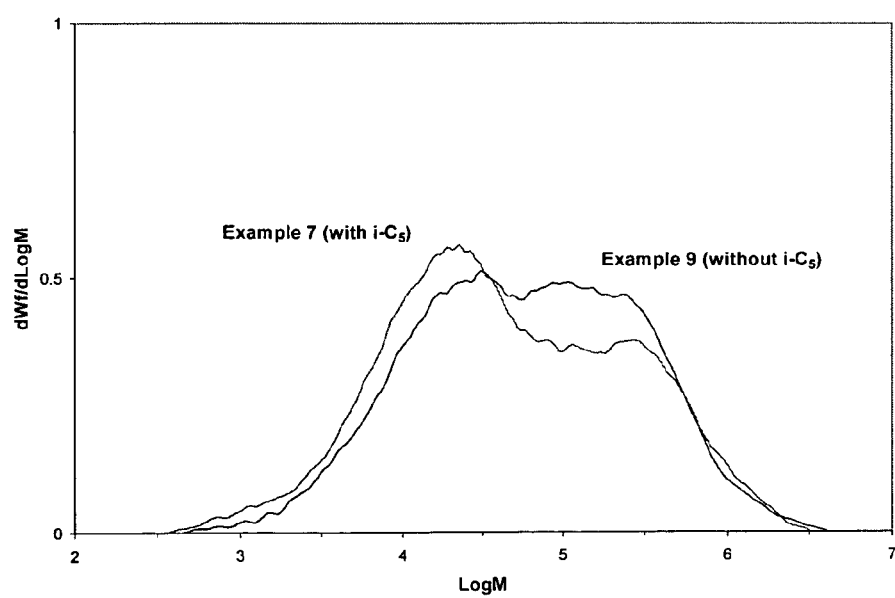
FIG. 6 shows the GPC profiles of the polymers produced in Examples 7 and 9.

FIG. 6 compares the GPC profiles of polymers produced by Examples 7 and 9. In the presence of isopentane, the ratio of the high MW fraction to the low MW fraction decreases.

The examples shown above demonstrate that when the individual catalyst components in a mixed catalyst respond differently to hydrogen, temperature, ethylene pressure and level of a non-polymerizable hydrocarbon, the polymer composition (the ratio of the high MW fraction to the low MW fraction and the comonomer placement) can be controlled by the conditions of the polymerization process.

What is claimed is:

1. A process for controlling one or more of the ratio of high molecular weight polymer to low molecular weight polymer and the comonomer distribution in a in polymerization process selected from the group consisting of a continuous fluidized bed gas phase polymerization at a temperature from 50 to 120° C. and a slurry polymerization in a single reactor at a temperature from 20 to 150° C. of a reaction mixture comprising one or more of hydrogen, $C_{1-7}$ non polymerizable hydrocarbons, and $C_{2-8}$ olefins polymerized in the presence of a dual catalyst wherein both catalyst components are on the same support:

(i) the first component of which comprises a catalyst of the formula:

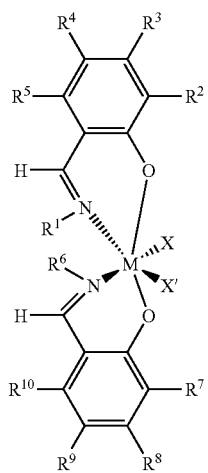

wherein M is a group 4 transition metal; $R^1$ and $R^6$ are independently selected from the group consisting of $C_{1-6}$ alkyl and $C_{6-10}$ aryl radicals; $R^2$ and $R^7$ are independently selected from the group consisting of $C_{3-5}$ secondary and tertiary alkyl radicals; $R^3$, $R^4$, $R^5$, $R^8$, $R^9$ and $R^{10}$ are independently selected from the group consisting of a hydrogen atom, $C_{1-4}$ alkyl radicals, $C_{6-10}$ aryl radicals, $C_1$-$C_4$ alkoxy radicals which substituents have a Hammett $\sigma_p$ value of less than 0.2; and X and X' are selected from the group consisting of a halogen atom, $C_{1-4}$ alkyl radicals, $C_{7-12}$ arylalkyl radicals, $C_{6-10}$ phenoxy radicals, amido radicals which may be substituted by up to two $C_{1-4}$ alkyl radicals and $C_{1-4}$ alkoxy radicals; and (ii) the second component of which comprises a catalyst of the formula:

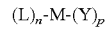

$(L)_n\text{-M-}(Y)_p$ wherein M is selected from the group consisting of Ti, Zr, and Hf; L is a monoanionic ligand independently selected from the group consisting of cyclopentadienyl-type ligands, and a bulky heteroatom ligand containing not less than five atoms in total of which at least 20%, numerically are carbon atoms and further containing at least one heteroatom selected from the group consisting of boron, nitrogen, oxygen, phosphorus, sulfur and silicon said bulky heteroatom ligand being sigma or pi-bonded to M; Y is independently selected for the group consisting of activatable ligands; n may be from 1 to 3; and p may be from 1 to 3, provided that the sum of n+p equals the valence state of M, and further provided that two L ligands may be bridged;

and an activator, which comprises one or more steps selected from the group consisting of:

(a) altering the temperature of the reaction by at least 2° C. within the range from 50 to 120° C. for a gas phase polymerization and within the range from 20 to 150° C. for a slurry phase polymerization;

(b) altering the partial pressure of the hydrogen component of the reaction mixture by at least 0.02 psi (0.138 KPa);

(c) altering the partial pressure of one or more monomers in the reaction mixture by not less than 10 psi (68.94 KPa); and (d) altering the amount of non polymerizable hydrocarbon in the gas phase reaction mixture by not less than 0.5 mole %.

2. The process according to claim 1, wherein the catalysts are supported on an organic, inorganic or a mixed support having have an average particle size from about 1 to 150 microns, a surface area greater than 10 $m^2$/g, and a pore volume from about 0.3 to 5.0 ml/g.

3. The process according to claim 2, wherein the support comprises silica.

4. The process according to claim 3, wherein the activator is selected from the group consisting of:

(i) a complex aluminum compound of the formula $R^{12}{}_2\text{AlO}(R^{12}\text{AlO})_m\text{AlR}^{12}{}_2$ wherein each $R^{12}$ is independently selected from the group consisting of $C_{1-20}$ hydrocarbyl radicals and m is from 3 to 50, and optionally a hindered phenol to provide a molar ratio of Al:hindered phenol from 2:1 to 5:1 if the hindered phenol is present;

(ii) ionic activators which may be free or tethered to a support said ionic activators selected from the group consisting of:

(A) compounds of the formula $[R^{13}]^+[B(R^{14})_4]^-$ wherein B is a boron atom, $R^{13}$ is a cyclic $C_{5-7}$ aromatic cation or a triphenyl methyl cation and each $R^{14}$ is independently selected from the group consisting of phenyl radicals which are unsubstituted or substituted with 3 to 5 substituents selected from the group consisting of a fluorine atom, a $C_{1-4}$ alkyl or alkoxy radical which is unsubstituted or substituted by a fluorine atom; and a silyl radical of the formula —Si—$(R^{15})_3$;

wherein each $R^{15}$ is independently selected from the group consisting of a hydrogen atom and a $C_{1-4}$ alkyl radical; and (B) compounds of the formula $[(R^{18})_t\text{ZH}]^+[B(R^{14})_4]^-$ wherein B is a boron atom, H is a hydrogen atom, Z is a nitrogen atom or phosphorus atom, t is 2 or 3 and $R^{18}$ is selected from the group consisting of $C_{1-8}$ alkyl radicals, a phenyl radical which is unsubstituted or substituted by up to three $C_{1-4}$ alkyl radicals, or one $R^{18}$ taken together with the nitrogen atom may form an anilinium radical and $R^{14}$ is as defined above; and (C) compounds of the formula $B(R^{14})_3$ wherein $R^{14}$ is as defined above; and (iii) mixtures of (i) and (ii).

5. The process according to claim 4, wherein in the first component X and X' are independently selected from the group consisting of a chlorine atom, a methyl radical, an ethyl radical and a benzyl radical.

6. The process according to claim 5, wherein in the first component $R^3$, $R^5$, $R^8$ and $R^{10}$ are hydrogen.

7. The process according to claim 6, wherein in the first component $R^4$ and $R^9$ are selected from the group consisting of a $C_1$-$C_4$ alkoxy radical.

8. The process according to claim 7, wherein in the first component $R^4$ and $R^9$ are methoxy radicals.

9. The process according to claim 8, wherein in the first component $R^1$ and $R^6$ are cyclohexyl radicals.

10. The process according to claim 9, wherein in the first component $R^2$ and $R^7$ are selected from the group consisting of t-butyl radicals.

11. The process according to claim 10, wherein in the second component the cyclopentadienyl-type ligand is a $C_{5-13}$ ligand containing a 5-membered carbon ring having delocalized bonding within the ring and bound to the metal atom through $\eta\eta^5$ bonds and said ligand being unsubstituted or up to fully substituted with one or more substituents selected from the group consisting of $C_{1-10}$ hydrocarbyl radicals in which hydrocarbyl substituents are unsubstituted or further substituted by one or more substituents selected from the group consisting of a halogen atom and a $C_{1-8}$ alkyl radical; a halogen atom; a $C_{1-8}$ alkoxy radical; a $C_{6-10}$ aryl or aryloxy radical; an amido radical which is unsubstituted or substituted by up to two $C_{1-8}$ alkyl radicals; a phosphido radical which is unsubstituted or substituted by up to two $C_{1-8}$ alkyl radicals; silyl radicals of the formula —Si—$(R)_3$ wherein each R is independently selected from the group consisting of hydrogen, a $C_{1-8}$ alkyl or alkoxy radical, and $C_{6-10}$ aryl or aryloxy radicals; and germanyl radicals of the formula Ge—$(R)_3$ wherein R is as defined above.

12. The process according to claim 11, wherein in the second component Y is independently selected from the group consisting of a hydrogen atom; a halogen atom, a $C_{1-10}$ hydrocarbyl radical; a $C_{1-10}$ alkoxy radical; a $C_{5-10}$ aryl oxide radical; each of which said hydrocarbyl, alkoxy, and aryl oxide radicals may be unsubstituted by or further substituted by one or more substituents selected from the group consisting of a halogen atom; a $C_{1-8}$ alkyl radical; a $C_{1-8}$ alkoxy radical; a $C_{6-10}$ aryl or aryloxy radical; an amido radical which is unsubstituted or substituted by up to two $C_{1-8}$ alkyl radicals; and a phosphido radical which is unsubstituted or substituted by up to two $C_{1-8}$ alkyl radicals.

13. The process according to claim 12, wherein the bulky heteroatom ligand is selected from the group consisting of phosphinimine ligands, ketimide ligands, silicon-containing heteroatom ligands, amido ligands, alkoxy ligands, boron heterocyclic ligands and phosphole ligands.

14. The process according to claim 13, wherein in the second component Cp is independently selected from the group consisting of a cyclopentadienyl radical, an indenyl radical and a fluorenyl radical.

15. The process according to claim 14, wherein Y is independently selected from the group consisting of a hydrogen atom, a chlorine atom and a $C_{1-4}$ alkyl radical.

16. The process according to claim 15, wherein the activator is a complex aluminum compound wherein $R^{12}$ is a methyl radical and m is from 10 to 40.

17. The process according to claim 16, wherein the molar ratio of Al to transition metal is from 10:1 to 500:1.

18. The process according to claim 17, wherein the second component has the formula

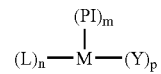

wherein M is a group 4 metal; Pl is a phosphinimine ligand; L is a monoanionic ligand selected from the group consisting of a cyclopentadienyl-type ligand; Y is an activatable ligand; m is 1 or 2; n is 0 or 1; and p is an integer and the sum of m+n+p equals the valence state of M.

19. The process according to claim 18, wherein the phosphinimine ligand has the formula $((R^{21})_3P=N)$— wherein each $R^{21}$ is independently selected from the group consisting of $C_{3-6}$ alkyl radicals which are unsubstituted or substituted by a heteroatom.

20. The process according to claim 19, wherein the phosphinimine ligand is tris t-butyl phosphinimine.

* * * * *